United States Patent
Yun et al.

(10) Patent No.: US 6,842,836 B2
(45) Date of Patent: Jan. 11, 2005

(54) STREAMING MEDIA CACHE FILING

(75) Inventors: Hai-Fang Yun, San Jose, CA (US); Leonard McCrigler, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 427 days.

(21) Appl. No.: 10/005,575

(22) Filed: Nov. 7, 2001

(65) Prior Publication Data

US 2003/0088736 A1 May 8, 2003

(51) Int. Cl.[7] ............................................. G06F 12/00
(52) U.S. Cl. ........................... 711/167; 711/3; 711/151; 711/168
(58) Field of Search ................................. 711/118, 160, 711/147, 151, 158, 167, 168; 710/52, 56, 57, 60

(56) References Cited

U.S. PATENT DOCUMENTS

| | | | | |
|---|---|---|---|---|
| 5,442,390 A | * | 8/1995 | Hooper et al. | 725/90 |
| 5,659,799 A | * | 8/1997 | Wu et al. | 710/57 |
| 6,327,418 B1 | * | 12/2001 | Barton | 386/46 |
| 6,507,562 B1 | * | 1/2003 | Kadansky et al. | 370/216 |
| 6,526,022 B1 | * | 2/2003 | Chiu et al. | 370/229 |
| 6,606,714 B1 | * | 8/2003 | Thelin | 714/8 |
| 6,643,747 B2 | * | 11/2003 | Hammarlund et al. | 711/151 |

* cited by examiner

*Primary Examiner*—T Nguyen

(57) ABSTRACT

A method of caching data. In one embodiment, the method is comprised of filling a cache with incoming data to a first level. The filling is at a rate relative to said incoming data. The method is further comprised of increasing the cache from the first level to an optimum level. Outputting of the incoming data is enabled subsequent to the cache attaining the first level. The method is further comprised of adjusting the level of said cache level concurrent with incoming data and data outputting. This adjusting prevents the level of the cache from exceeding a maximum cache level and prevents the level of the cache from decreasing below the first level, such that smooth and continuously-streaming outputting of said data is provided.

21 Claims, 7 Drawing Sheets

STREAMING MEDIA CACHE FILING

FIELD OF THE INVENTION

The present invention relates to caching of data. More particularly, the present invention relates to caching of streaming data.

BACKGROUND OF THE INVENTION

Advancements in computer and electronic technology have created smaller, more powerful computer systems. Accordingly, new categories of computer systems, such as handheld computers, have also been developed. Further, these computer systems are well suited to interact with other computer systems to exchange data.

Additionally, with the advent of more powerful computers, new types of data have been created. Some examples of the new data types created can include streaming media (e.g., audio or video files), MP3 files, Real Audio, and the like. Nearly all of the streaming media data types can be distributed to a computer system via a digital medium, such as CDs, DVDs, floppy disks, SD (secure digital) cards, and the like, and then replayed on the appropriate multimedia device. Further, it is well known that the streaming media types are commonly distributed to computer systems via the Internet, provided the computer system is so enabled.

However, the speed with which the streaming media data type is played rarely equals the rate with which the streaming media is received. For example, when a computer system is utilizing a CD/DVD multimedia player to play music or a movie, it is common to see and/or hear the CD/DVD player start and stop during playback. It is also common to see the work indicator light related to the operation of the CD/DVD player flash on and off in response to the player repeatedly starting and stopping. This starting and stopping is caused, in part, by the incoming rate of the streaming media (from a multimedia device or stored file) being of a rate which can be unequal to or incompatible with the rate of output (media replayed via a video monitor or via audio speakers).

When the incoming rate of the streaming media is too slow in comparison to the output, the cache or allotted memory becomes empty. Until additional data is received, the video or audio being played then pauses while waiting for more incoming data. When the incoming rate of the streaming media is too fast, in comparison to the output, the cache or allotted memory becomes full. Until the cache or allotted memory becomes un-full, the multimedia device providing the incoming data pauses until more cache or memory space becomes available. These inequalities in incoming and outgoing streaming media rates can cause the replayed or output streaming media to have visible and audible hesitations and interruptions when the streaming media is video, and audible hesitations and interruptions when the streaming media is audio. This distortion of the streaming media during presentation can degrade most user's multimedia experience.

With regard to streaming media incoming over the Internet, and then outputted to a user, it is well known that the transmission of data, e.g., nearly any kind of data, is packet based. This means that the data, almost always regardless of size, is figuratively chopped up into smaller bits of data, called packets. It is well known in the art that an average packet size is about 1000 bytes. These packets of approximately 1000 bytes are then sent from a sending computer system to a receiving computer system, one after another, and then outputted to a user. There are many factors which govern the speed with which the packets can be received. Some of those factors can include, but are not limited to, the sending computer system's power and capacities, the receiving computer system's power and capacities, type and speed of the intercommunication connection between the computer systems, and many others.

Once some of the data packets are received in a cache or allotted memory space, outputting can commence. However, if the sending computer system can't keep up with the streaming data output of the outputting computer system, the cache or allotted memory can become empty. This can cause the outputting of the streaming media to hesitate and to have interruptions. Further, by requiring more packets at a faster rate in an attempt to refill the cache or allotted memory space, this can cause an excessive load to be placed upon the sending computer and/or the network, which can in some circumstances, cause the sending computer system or the network to which it is connected to bog down under the extra load. On the other hand, if too many data packets are required before outputting can commence, some users may find this somewhat extended wait time before outputting highly irritating.

Thus a need exists for a method of media caching which controls the level of the cache. A further need exists for a media caching method that provides an optimum cache level, relative to the media type it is caching. An additional need exists for a method of media caching which monitors the cache level. Another need exists for a method of media caching which can regulate the rate of incoming media in response to the monitored cache level.

SUMMARY OF THE INVENTION

The present invention provides a method for data caching. In one embodiment, the method is comprised of filling a cache with incoming data to a first level. The filling is at a rate relative to said incoming data. The method is further comprised of increasing the cache from the first level to an optimum level. Outputting of the incoming data is enabled subsequent to the cache attaining the first level. The method is further comprised of adjusting the level of said cache level concurrent with incoming data and data outputting. This adjusting prevents the level of the cache from exceeding a maximum cache level and prevents the level of the cache from decreasing below the first level, such that smooth and continuously-streaming outputting of said data is provided.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

A method of data caching is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

The present invention is discussed primarily in the context of data caching of streaming media in an electronic system such as a desktop, laptop, or a handheld computer system. It is noted that the present invention is well suited to be utilized with many other data types, e.g., program software distributed by ASPs, (application service providers). It is appreciated that the present invention can be used with other types of portable electronic devices that provide playback of streaming media, such a portable DVD, CD, and MP3 players. It is further appreciated that the present invention can be used with other electronic devices and computer systems that have the capability to access some type of central device or central site, including but not limited to desktop, laptop, or handheld computer systems.

Exemplary Electronic System

Figure 1:
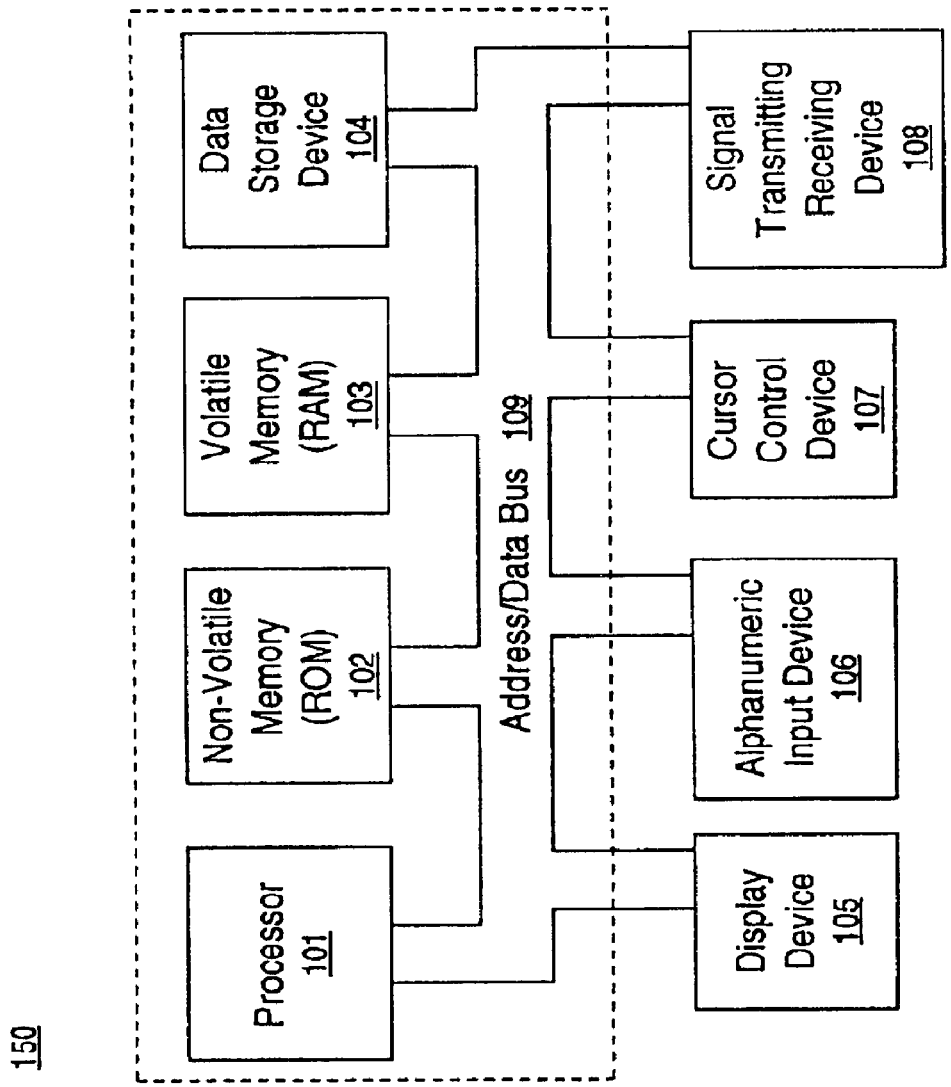
FIG. 1 is a block diagram of an exemplary computer system upon which embodiments of the present invention may be practiced.

With reference to FIG. 1, portions of the present invention are comprised of computer-readable and computer executable instructions which reside, for example, in computer-readable media of an electronic system such as a computer system. FIG. 1 illustrates an exemplary electronic device 150 upon which embodiments of the present invention may be practiced. It should be appreciated that electronic device 150 of FIG. 1 is an exemplary representation of a number of different computer systems and electronic devices in which the present invention can operate, including but not limited to desktop computers, e.g., desktop computer 102 of FIG. 2B, laptop computer 101 of FIG. 2B, handheld computer 100 of FIG. 2B, portable DVD or CD players, MP3 players, cell phones, pagers, etc.

Electronic system 150 includes an address/data bus 109 for communicating information, a processor 101 coupled with bus 109 for processing information and instructions, a non-volatile memory (ROM—read only memory) 102 coupled with bus 109 for storing static information and instructions for processor 101, and a volatile memory (RAM—random access memory) 103 coupled with bus 109 for storing information and instructions for the processor 101. Electronic device 150 also includes data storage device 104 such as a magnetic or optical disk and disk drive coupled with bus 109 for storing information and instructions. Data storage device 104 can include one or more removable magnetic or optical storage media, e.g., diskettes, tapes, SD (secure digital) cards, MMC (multi-media cards), which are computer readable memories. Memory units of electronic device 150 include volatile memory 103, non-volatile memory 102, and data storage device 104.

Electronic device 150 of FIG. 1 can further include an optional signal generating device 108, e.g., a wired or wireless network interface card (NIC) coupled with bus 109 for interfacing with other computer systems and/or other electronic devices. Electronic device 150 can also include an optional alphanumeric input device 106 which includes alphanumeric and function keys coupled with bus 109 for communicating information and command selections to processor 101. An optional display device 105 can be coupled with bus 109 for displaying information to a computer user. Display device 105 may be a liquid crystal display (LCD), a cathode ray tube (CRT), a flat panel display such as an FED (field emission display), an electronic paper display, or nearly any other display device suitable for creating and generating graphic images and alphanumeric characters recognizable to a user.

Electronic device 150 also includes an optional cursor control or directing device 107 coupled with bus 109 for communicating user input information and command selections to processor 101. Cursor control device 107 allows the user to dynamically signal the two dimensional movement of a visible symbol (cursor) on a display screen of display device 105. Many implementations of cursor control device 107 are known in the art, including but not limited to, a trackball, mouse, optical mouse, touch pad, touch screen, joystick, or special keys on alphanumeric input device 106 capable of signaling movement of a given direction or manner of displacement. Alternatively, it is appreciated that a cursor can be directed and/or activated via input from alphanumeric input device 106 using special keys and/or key sequence commands.

Figure 2A:
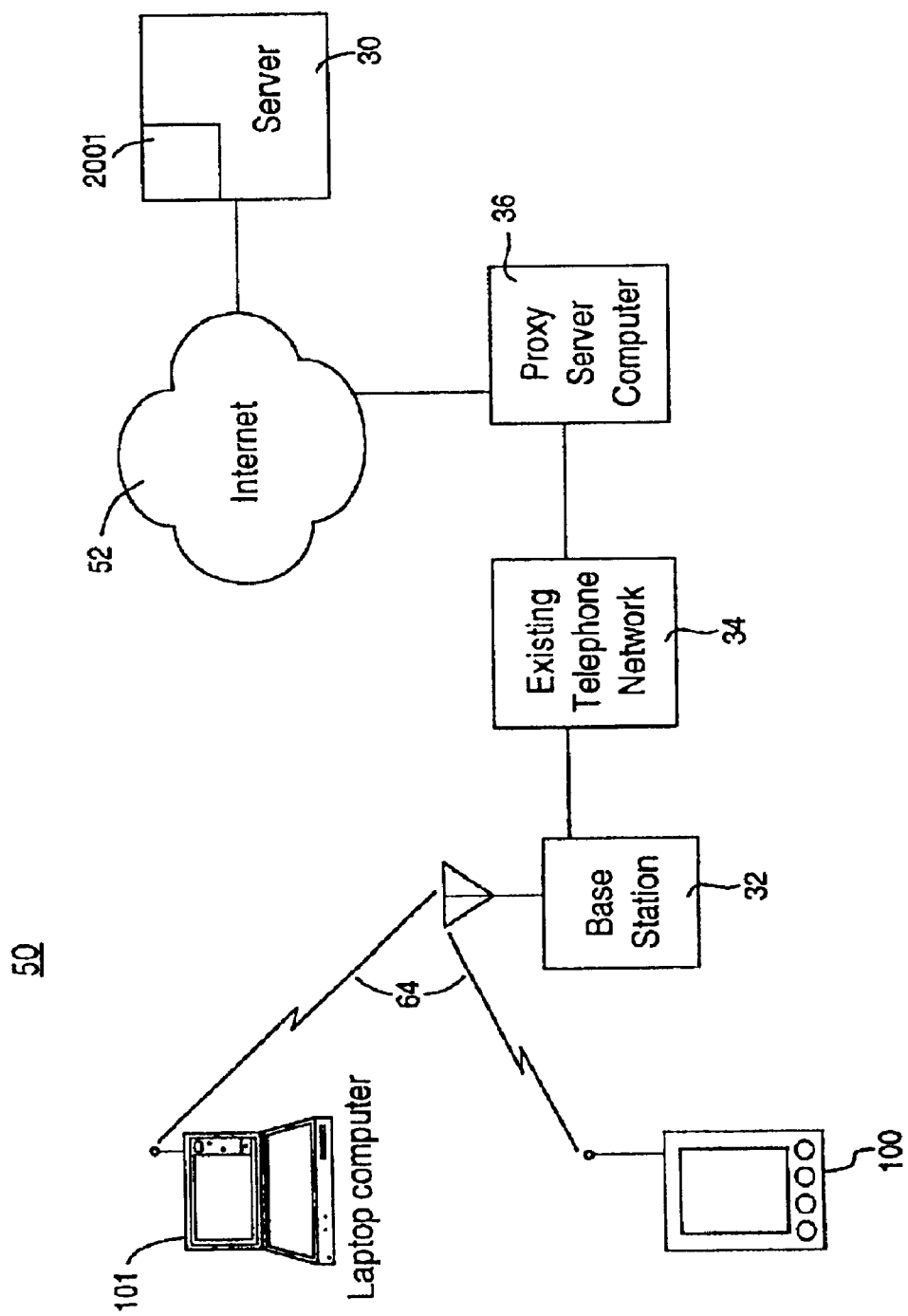
FIG. 2A is a block diagram of an exemplary network environment including a laptop and a handheld computer system upon which embodiments of the present invention may be practiced.

FIG. 2A is a block diagram of an exemplary network environment 50 including a portable computer system 100 and a laptop computer system 101 upon which embodiments of the present invention may be practiced, in accordance with one embodiment of the present invention. Portable computer system 100 is also known as a palmtop or palm-sized computer system. In one embodiment, portable computer system 100 and laptop computer system 101 have the ability to transmit and receive data and information over a wireless communication interface (e.g., a radio interface), as indicated by line 64. For purposes of the present application, the term "portable computer system" is not intended to be limited solely to conventional palmtop or portable computers. Instead, the term "portable computer" or "portable computer system" is also intended to include any mobile electronic device. Such mobile devices include but are not limited to pagers and paging systems, wireless and cellular telephones, electronic address books, portable DVD/CD players, MP3 players, and numerous other mobile devices that may have the ability to wirelessly communicate with a network. As such, for purposes of the present application, the terms "portable computer" and "mobile device" will be considered synonymous and will be used interchangeably.

Base station 32 can be both a transmitter and receiver base station, which can be implemented by coupling it into an existing public telephone network 34. Implemented in this manner, base station 32 enables portable computer system 100 and laptop computer system 101 to communicate with a proxy server computer system 36, which is coupled by wire to the existing public telephone network 34. Furthermore, proxy server computer system 36 is coupled to the Internet 52, thereby enabling portable computer system 100 and laptop computer system 101 to communicate with the Internet 52, and to site 30, where, in one embodiment, the present invention, DCP (data cache program) 2001 is disposed. In one embodiment, site 30 can be a Web site. In another embodiment, site 30 can be server. In another embodiment, site 30 may a handheld computer system 100, a laptop computer system 101, a desktop computer system 102, or other electronic device. When communicating with site 30 over Internet 52, protocols such as CTP (Compact Transport Protocol) and CML (Compact Markup Language) and WML (Wireless Markup Language) can be used by portable computer system 100 and laptop computer system 101 in the present embodiment.

It should be appreciated that one of the functions of proxy server 36 is to perform operations over the Internet 52 on behalf of portable computer system 100 and laptop computer system 101. For example, proxy server 36 has a particular Internet address and acts as a proxy device for portable computer system 100 over the Internet 52. It should be further appreciated that other embodiments of a communications network, planned or envisioned, may be utilized in accordance with the present invention. For example, a wireless connection may be made from portable computer system 100 and/or laptop computer system 101 directly to the Internet 52 to access site 30.

The data and information which are communicated between base station 32 and portable computer system 100 and laptop computer system 101 are the same type of information and data that can conventionally be transferred and received over a public telephone wire network system. Additionally, in FIG. 2A, the existing telephone network could also be a packet-based network utilized by some conventional portable computer systems. However, a wireless communication interface is utilized to communicate data and information between portable computer system 100 and base station 32. Furthermore, nearly any wireless network can support the functionality to be disclosed herein. It is appreciated that in one embodiment, a desktop computer system 102 (FIG. 2B) can be implemented analogous to the implementation of portable computer system 100 and laptop computer system 101 as described above, provided desktop computer system 102 is analogously equipped.

Figure 2B:
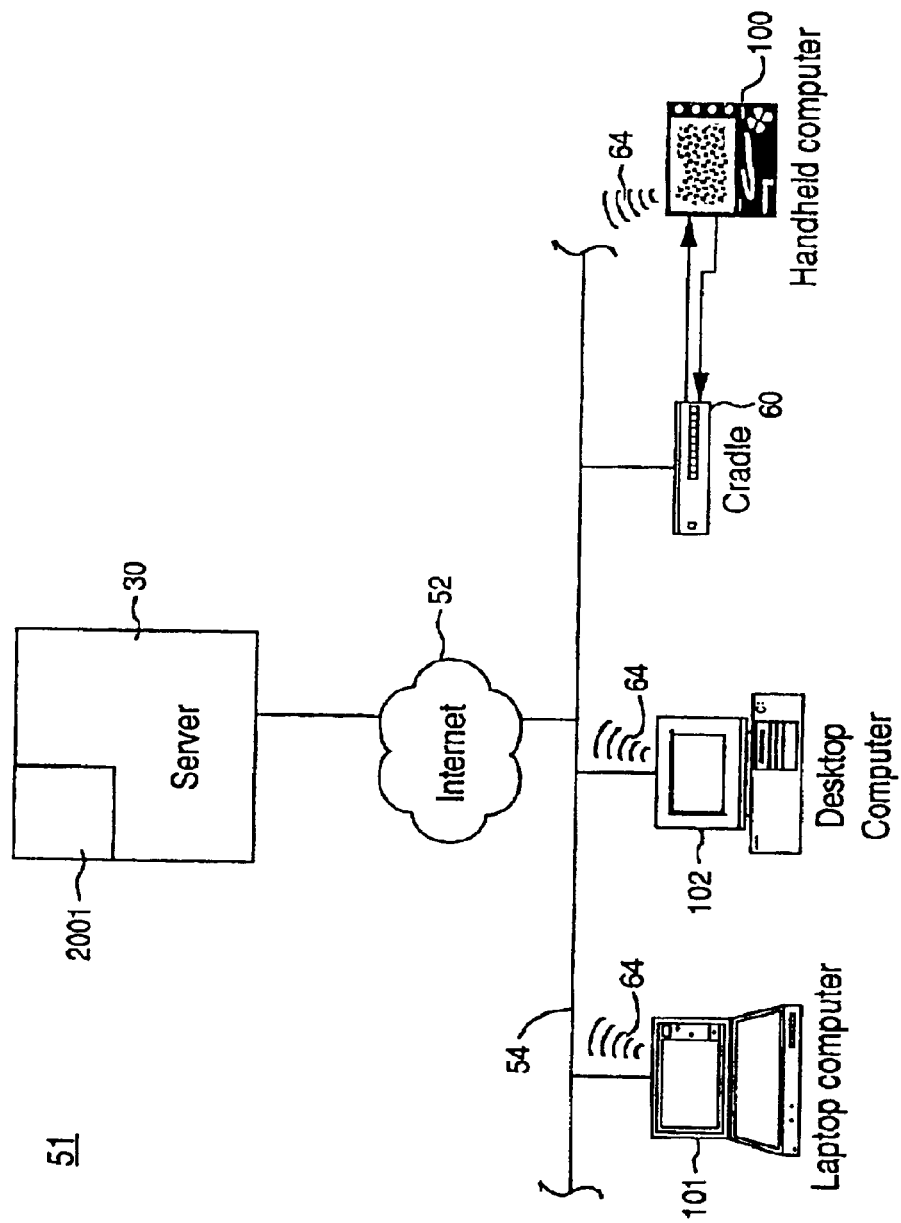
FIG. 2B is a diagram of a desktop, laptop, and handheld computer system connected to each other and the Internet in a network environment and upon which embodiments of the present invention may be practiced.

FIG. 2B illustrates another embodiment of a system 51 that can be used in conjunction with various embodiments of the present invention. System 51 comprises a host computer system that can either be a desktop unit 102 or alternatively, a laptop system 101. Optionally, one or more host computer systems can be used within system 51. Host computer systems 102 and 101 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 and to site 30 using a number of well-known protocols.

Importantly, bus 54 may also be coupled to a cradle 60 for receiving and initiating communication with portable computer system 100. Cradle 60 provides an electrical and mechanical communication interface between bus 54 (and accordingly, anything coupled to bus 54) and the computer system 100 for two-way communications. Portable computer system 100 may instead be coupled to host computer systems 101 and 102 via a wireless (radio) connection. Portable computer system 100 also contains a wireless infrared communication mechanism 64 for sending and receiving information from other devices. Additionally, in FIG. 2B, the existing telephone network could also be a packet-based network utilized by some conventional portable computer systems.

With reference to both FIGS. 2A and 2B, it is appreciated that portable computer system 100, laptop computer system 101, and desktop computer system 102 can be used in a network environment combining elements of networks 50 and 51. That is, computer systems 100, 101, and 102 can include both a wireless infrared communication mechanism and a signal (e.g., radio) receiver/transmitter device.

Figure 2C:
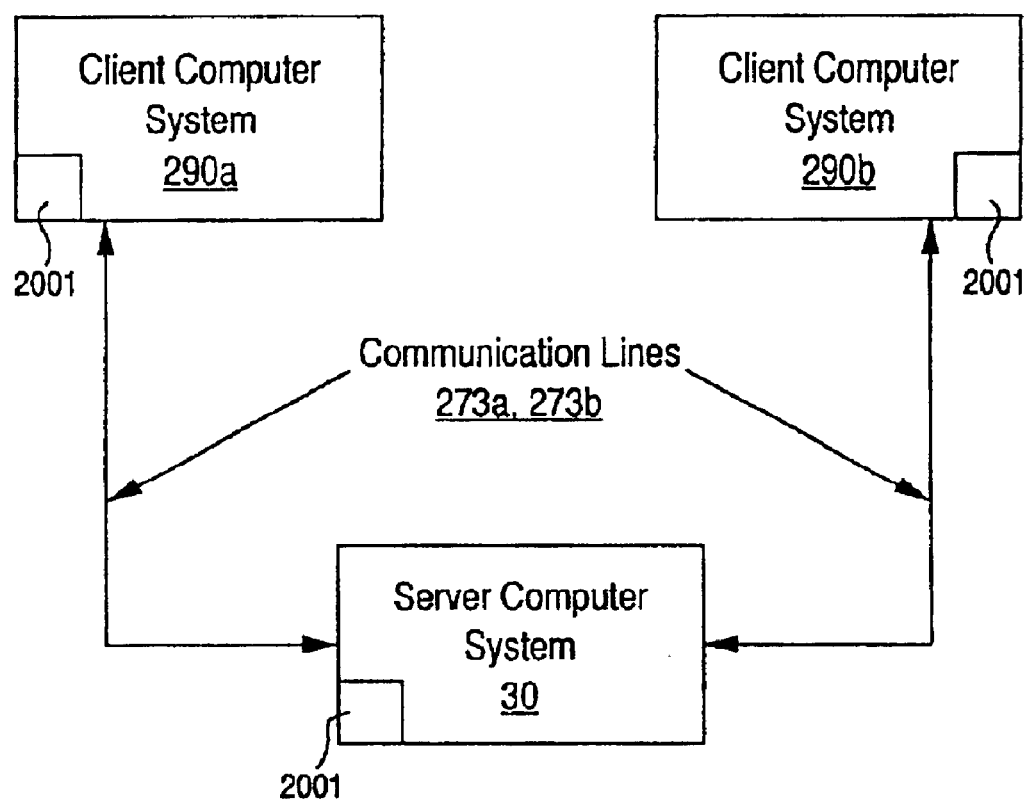
FIG. 2C is a block diagram of a client/server network environment upon which embodiments of the present invention may be practiced.

FIG. 2C is a block diagram illustrating an exemplary client-server computer system network 250 upon which embodiments of the present invention may be practiced. Network 250 may be a communication network located within a firewall of an organization or corporation (an "Intranet"), or network 250 may represent a portion of the World Wide Web or Internet. Client (or user) computer systems 290a and 290b and server computer system 30 are communicatively coupled via communication lines 273a and 273b; the mechanisms for communicatively coupling computer systems over the Internet or over Intranets are well-known in the art. It should be appreciated that electronic system 150 of FIG. 1 can be implemented as a client computer systems, e.g., client computer system 290a or 290b of FIG. 2C or electronic system 150 can be implemented as a server computer system 30, also of FIG. 2C. This coupling can be accomplished over any network protocol that supports a network connection, such as IP (Internet Protocol), TCP (Transmission Control Protocol), NetBIOS, IPX (Internet Packet Exchange), and LU6.2, and link layers protocols such as Ethernet, token ring, and ATM (Asynchronous Transfer Mode). Alternatively, client computer systems 290a and 290b can be coupled to server computer 30 via an input/output port (e.g., a serial port) of server computer system 30; that is, client computer systems 290a and 290b and server computer system 30 may be non-networked devices. Though network 250 of FIG. 2C is shown to include one server computer system 30 and two client computer systems, 290a and 290b, respectively, it is appreciated that more than one server computer system 30 and more than two client computer systems can be used.

It is appreciated that in one embodiment, client computer systems 290a and 290b and server computer 30 have an instancing of DCP (data cache program) 2001 disposed therein. It is appreciated that, in one embodiment of the present invention, DCP 2001 is co-disposed in the computer system from where the streaming media originates and in the computer system where the streaming media is distributed. In another embodiment, it is appreciated that DCP 2001 is well suited to interact with any number of video servers, such that DCP 2001 is disposed only in a client computer, e.g., client computer 290a. In another embodiment, client computer 290a may be enabled to directly communicate with client computer 290b, without utilizing server 30. In the present embodiment, because video servers are not commonly located in client computer systems, both client computer 290a and 290b are configured with DCP 2001.

Figure 3A:
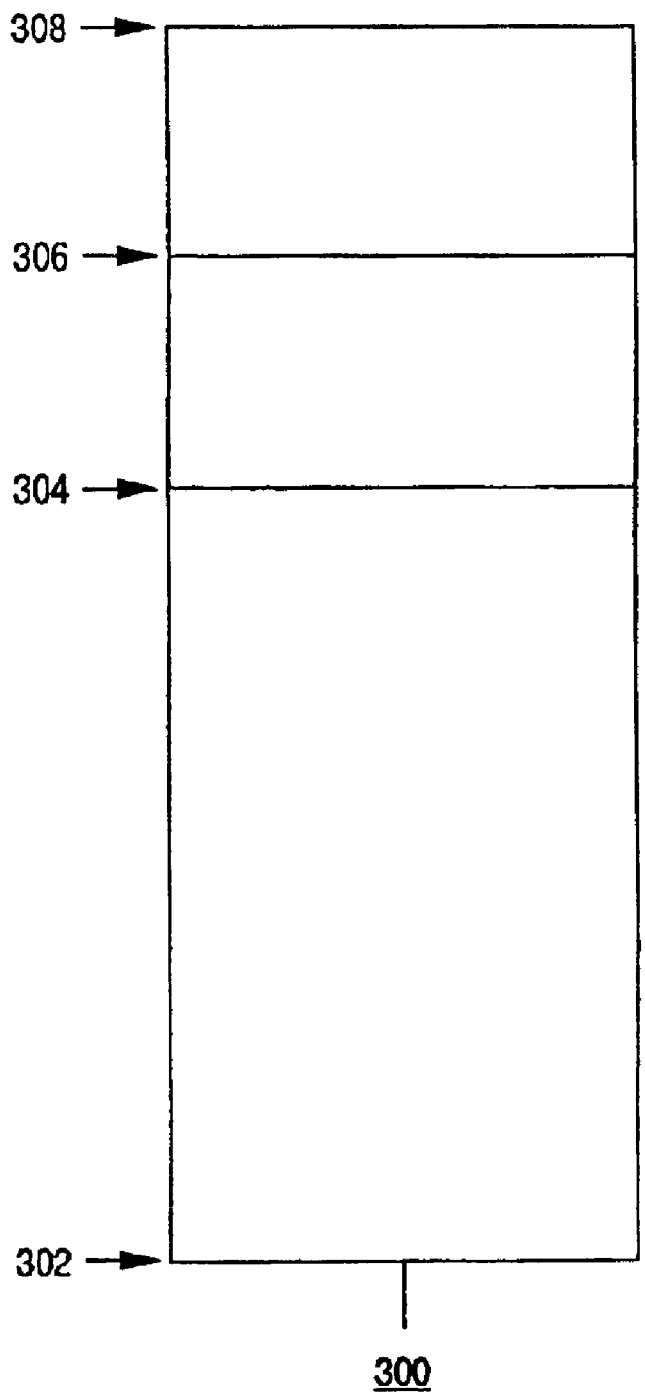
FIG. 3A is a diagram illustrating levels of a multimedia memory cache, in accordance with one embodiment of the present invention.

FIG. 3A shows, in one embodiment of the present invention, a block diagram illustrating a cache 300, as defined by DCP 2001. Cache 300 comprises cache level indicator 302, for indicating when the level of cache 300 is empty, in one embodiment. Also shown in cache 300 is cache level indicator 304, representing the level when cache 300 is at a minimum level, also called low water mark 304, in one embodiment. Cache 300 further comprises cache level indicator 306, for indicating the optimum cache level, also called high water mark 306. Cache 300 is further comprised of cache level indicator 308, for indicating when the level of cache 300 is full.

It is appreciated that in one embodiment, cache 300 is disposed within a volatile memory unit, such as RAM 103 of FIG. 1.

Figure 3B:
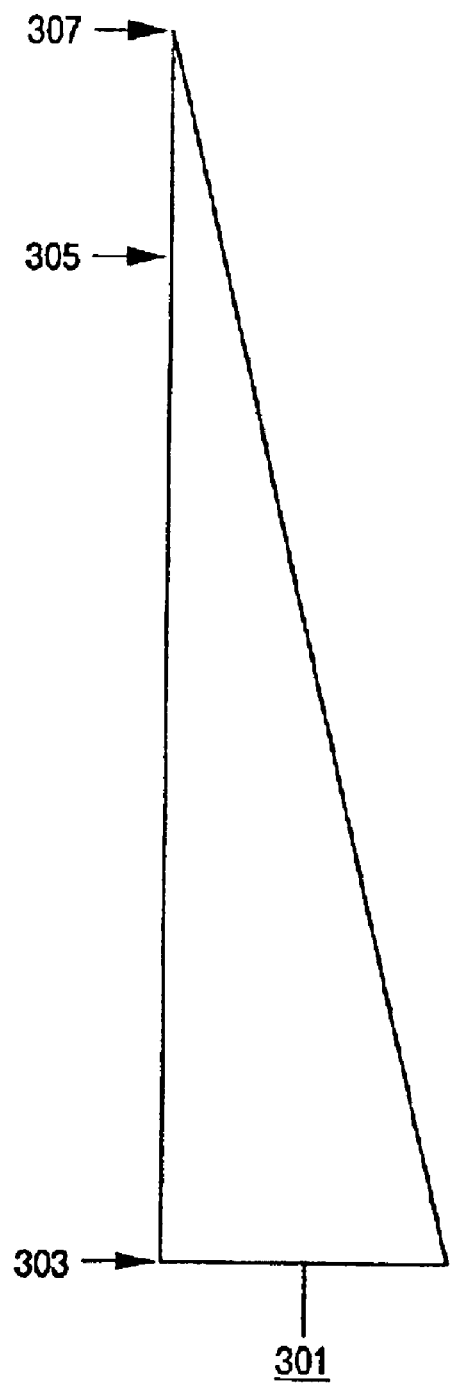
FIG. 3B is a diagram illustrating streaming media data rates, in accordance with one embodiment of the present invention.

FIG. 3B is an illustration of a cache fill rate 301, in one embodiment of the present invention. It is appreciated that the cache fill rate is faster at the bottom and slower at the top of FIG. 3B. Cache fill rate 301 comprises a cache fill rate level 303, representing a maximum streaming rate. Cache fill rate 303 further comprises a cache fill rate level 305, representing an optimum streaming rate. It is appreciated that each type of data, e.g., video, audio, application, etc., needs its data at a certain rate of speed, although not limited to a fixed bit rate, in order to be processed efficiently. Accordingly, optimum streaming rate 305 is variable, dependent upon the type of data that comprises the incoming data. Cache fill rate 303 further comprises a cache fill rate level 307, representing a minimum streaming rate. DCP 2001 linearly controls cache fill rate 301 relative to the level of cache 300. In one embodiment, as cache 300 fills, cache fill rate 301 decreases, and as cache 300 empties, cache fill rate 301 increases.

Referring now to both FIGS. 3A and 3B, DCP 2001, the present invention, is designed and adapted to keep cache 300 filled to an optimum level 306. As the data arrives from, e.g., a video server in site 30 (FIG. 2B), it is placed into cache 300, which, in one embodiment, is a memory space allocated in RAM 102 of electronic device 150 of FIG. 1. It is appreciated that when cache 300 is initially filled, commencing at cache level 302 (empty), it is filled to cache level indicator 304 (minimum/low water mark). Once the level of cache 300 has attained low water mark 304, outputting of the data is enabled. The rate at which the data arrives is tunable, so the video server (site 30 of FIG. 2B) can determine an acceptable delay between the time of initial filling at the time when outputting of the data is enabled.

It is appreciated that a longer delay enables cache 300 to collect more data. This is especially advantageous when a large amount of data is incoming, because both the danger of running out of data and the strain placed on the network is substantially reduced.

It is further appreciated that, in one embodiment, too long of a delay regarding the time between initial filling of cache 300 with data and the outputting of the data can irritate a user. Additionally, if the delay is too short, the time needed to receive the minimum amount of incoming data can be insufficient such that the video server in site 30 and the network to which it is coupled would struggle to move the data, placing a significant load strain upon site 30 and the network, such that in some circumstances, both site 30 and the network may become congested. DCP 2001, interacting with the video server of site 30 or with another instancing thereof reduces the likelihood of such an occurrence from happening.

Subsequent to cache 300 attaining low water mark 304, such that outputting of the data in cache 300 is enabled, DCP 2001 dynamically monitors the level of cache 300 and linearly adjusts the incoming rate of the data from the video server of site 30, such that, in one embodiment, cache 300 is kept at or near cache level 306, also called optimum level or high water mark 306. In one embodiment, when the level of cache 300 is above optimum level 306, DCP 2001 reduces the incoming data rate by a percentage equal to the percentage cache 300 is above optimum level 306. For example, if the level of cache 300 is ten percent above optimum level 306, the incoming data rate, as controlled by DCP 2001, is reduced by ten percent. In one embodiment, when the level of cache 300 is below optimum level 306, DCP 2001 increases the incoming data rate by a percentage equal to the percentage that cache 300 is below optimum level 306. For example, if the level of cache 300 is fifteen percent below optimum level 306, the incoming data rate, as controlled by DCP 2001, is increased by fifteen percent. It is appreciated that as the level of cache 300 draws nearer to optimum level 306, DSP 2001 adjusts the incoming data rate accordingly, so as to maintain the level of cache 300 at or near optimum level 306.

Figure 4:
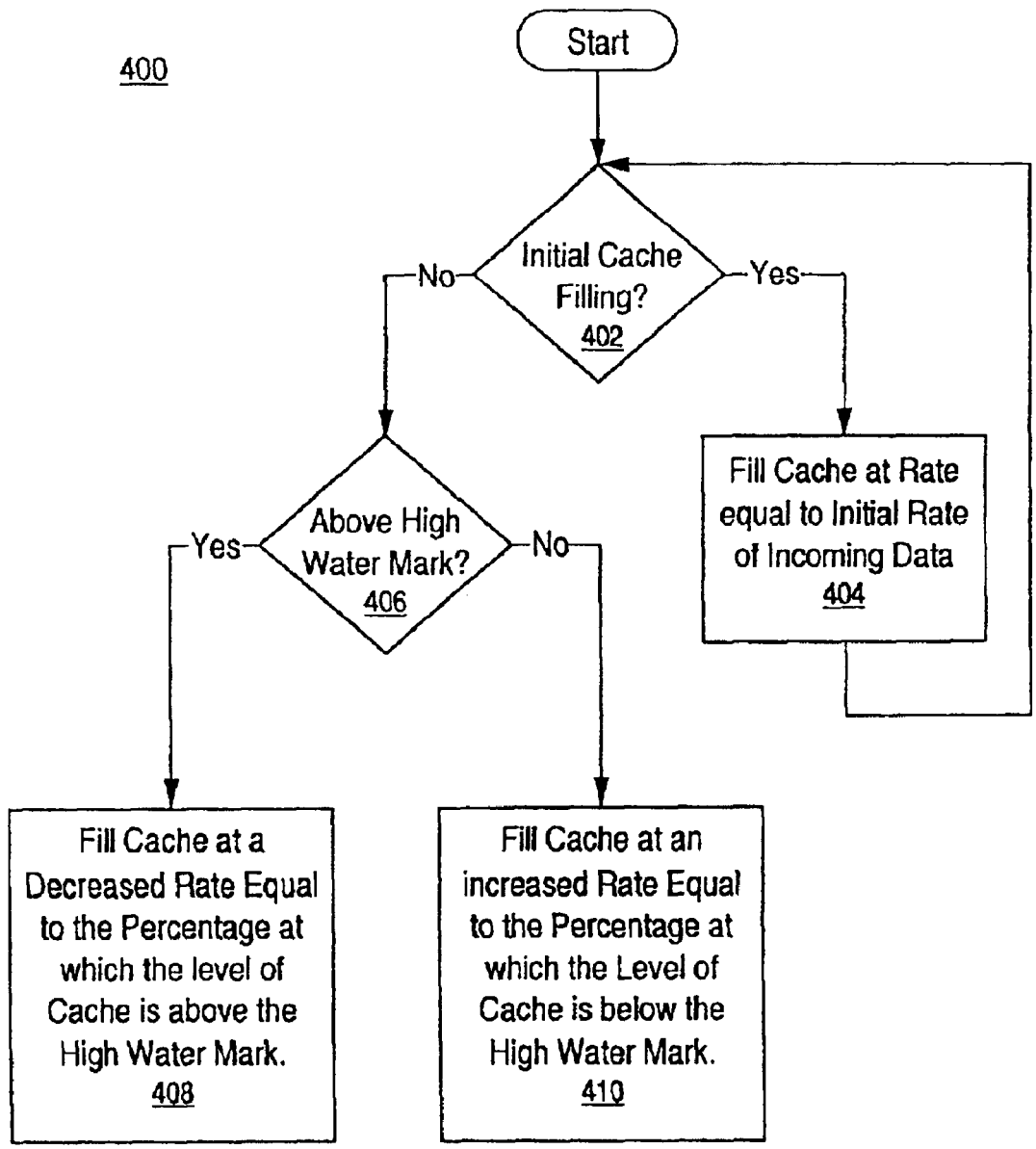
FIG. 4 is a flow chart illustrating a process for data cache management, in accordance with one embodiment of the present invention.

FIG. 4 is a flowchart showing the steps in a process 400 for data caching of incoming data, e.g., streaming media, in one embodiment of the present invention.

In Step 402 of FIG. 4, if the cache, e.g., cache 300 of FIG. 3A, is being initially filled, the cache is filled in accordance with an initial rate of the incoming data, e.g., maximum streaming rate 303 of FIG. 3B, as shown in Step 404. The cache (cache 300 of FIG. 3A) is filled to a minimum level, e.g., low water mark 304 of FIG. 3A. Subsequent to the cache attaining low water mark 304, outputting of the data in the cache is enabled.

In Step 402 of FIG. 4, if the cache, e.g., cache 300 of FIG. 3A, has been initially filled, as described in step 404, DCP 2001 monitors the level of cache 300, such that it remains at or near high water mark 306 (FIG. 3A), as shown in Step 406.

In Step 406, if the level of the cache (cache 300) is above high water mark 306, as shown in FIG. 3A, DCP 2001 decreases the rate, as shown in Step 408, at which the cache is filled by a percentage equal to the percentage at which the cache is above high water mark 306, in one embodiment of the present invention.

In Step 406, if the level of the cache (cache 300) is below high water mark 306, as shown in FIG. 3A, DCP 2001 increases the rate, as shown in Step 410, at which the cache is filled by a percentage equal to the percentage at which the cache is below high water mark 306, in one embodiment of the present invention.

It is appreciated that as the level of cache 300 draws closer to high water mark 306, the incoming data rate is dynamically and linearly adjusted relative to the percentage above or below high water mark 306 cache 300 is disposed.

In conclusion, by maintaining cache 300 at an optimum level, high water mark 306 of FIG. 3A, DCP 2001 provides a smooth and continuously-streaming video, audio, or application to the user, void of the commonly present hesitations and interruptions which previously would distort the presentation of the data.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of caching data comprising:
    filling a cache with incoming data to a first level, said filling at a rate relative to said incoming data;
    increasing said cache from said first level to an optimum level concurrent with data outputting; and
    adjusting the level of said cache concurrent with incoming data and data outputting to prevent said level of said cache from exceeding a maximum cache level and to prevent said level of said cache from decreasing below said first level, such that continuous streaming outputting of said data is provided.

2. The method as recited in claim 1 wherein said data outputting is enabled subsequent to said level of said cache attaining said first level.

3. The method as recited in claim 1 wherein said increasing of said cache level from said first level to said optimum level further comprises altering said rate of incoming data incoming to a rate greater than the rate of said data outputting.

4. The method as recited in claim 1 wherein said adjusting of said cache level further comprises increasing said rate of incoming data at a percentage relative to the percentage at which the cache level is below said optimum level.

5. The method as recited in claim 1 wherein said adjusting of said cache level further comprises decreasing said rate of incoming data at a percentage relative to the percentage at which the cache level is above said optimum level.

6. The method as recited in claim 1 wherein said data is streaming data.

7. The method as recited in claim 1 wherein said cache is a memory unit.

8. A computer system in a computer system network, said computer comprising:

a bus;

a display device coupled to said bus;

a memory unit coupled to said bus;

a processor coupled to said bus, said processor for executing a method for caching data, said method for caching data comprising:

filling a cache with incoming data to a first level, said filling at a rate relative to said incoming data;

increasing said cache from said first level to an optimum level concurrent with data outputting; and adjusting the level of said cache concurrent with said incoming data and said data outputting to prevent said cache level from reaching a maximum cache level and to prevent said cache level from falling below said first level, such that continuous streaming outputting of data is provided.

9. The computer system of claim 8 wherein said data outputting is enabled subsequent to the level of said cache attaining said first level.

10. The computer system of claim 8 wherein increasing of said cache level from said first level to said optimum level in said method of caching data further comprises altering said rate of incoming data to a rate greater than the rate of said data outputting.

11. The computer system of claim 8 wherein adjusting of said cache level in said method of caching data further comprises increasing said rate of incoming data at a percentage relative to the percentage at which said cache level is below said optimum level.

12. The computer system of claim 8 wherein adjusting of said cache level in said method of caching data further comprises decreasing the rate of incoming data at a percentage relative to the percentage at which said cache level is above said optimum level.

13. The computer system of claim 8 wherein said data is streaming data.

14. The computer system of claim 8 wherein said cache is a memory unit.

15. A computer-usable medium having computer-readable program code embodied therein for causing a computer system to perform:

filling a cache with incoming data to a first level, said filling at a rate relative to said data;

increasing said cache from said first level to an optimum level concurrent with data outputting; and adjusting the level of said cache concurrent with incoming data and data outputting to prevent the level of said cache from reaching a maximum cache level and to prevent the level of said cache from falling below said first level, such that continuous-streaming outputting of data is provided.

16. The computer-usable medium of claim 15 wherein said data outputting is enabled subsequent to the level of said cache attaining said first level.

17. The computer-usable medium of claim 15 wherein said computer-readable program code embodied therein causing a computer system to perform increasing said cache level from said first level to said optimum level further comprises altering said rate of incoming data to a rate greater than the rate of data outputting.

18. The computer-usable medium of claim 15 wherein said computer-readable program code embodied therein causing a computer system to perform adjusting said cache level further comprises increasing said rate of incoming data at a percentage equal to the percentage at which the cache level is below said optimum level.

19. The computer-usable medium of claim 15 wherein said computer-readable program code embodied therein causing a computer system to perform adjusting said cache level further comprises decreasing said rate of incoming data at a percentage relative to the percentage at which said cache level is above said optimum level.

20. The computer-usable medium of claim 15 wherein said data is streaming data.

21. The computer-usable medium of claim 15 wherein said cache is a memory unit.

* * * * *